(12) United States Patent
Sakamoto et al.

(10) Patent No.: US 6,243,331 B1
(45) Date of Patent: Jun. 5, 2001

(54) METHOD AND APPARATUS FOR PERFORMING ADDRESS INTERPOLATION ON OPTICAL DISK

(75) Inventors: Hiroshi Sakamoto; Noriyuki Manabe, both of Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/256,937

(22) Filed: Feb. 24, 1999

(30) Foreign Application Priority Data

Feb. 25, 1998 (JP) .................................................. 10-043220

(51) Int. Cl.⁷ ................................................................ G11B 17/22
(52) U.S. Cl. .......................... 369/33; 369/47.18; 369/53.12
(58) Field of Search .................................. 369/33, 54, 32, 369/47.1, 47.14, 47.18, 53.42, 53.12

(56) References Cited

U.S. PATENT DOCUMENTS

| | | | |
|---|---|---|---|
| 4,839,878 | * 6/1989 | Inoue | 369/54 |
| 5,202,877 | * 4/1993 | Yanagida | 369/58 |
| 5,241,521 | * 8/1993 | Shigemori | 369/32 |
| 5,343,453 | * 8/1994 | Ogino | 369/44.28 |
| 5,469,417 | * 11/1995 | Tanoue et al. | 369/50 |
| 5,497,364 | * 3/1996 | Ichikawa et al. | 369/58 |
| 5,499,224 | * 3/1996 | Sanada | 369/48 |
| 5,694,386 | * 12/1997 | Hirajima et al. | 369/48 |
| 5,848,047 | * 12/1998 | Fujimoto | 369/54 |
| 5,878,184 | * 3/1999 | Tajiri | 386/126 |
| 6,041,029 | * 3/2000 | Iida et al. | 369/48 |

FOREIGN PATENT DOCUMENTS 08111075   4/1996   (JP) .

* cited by examiner

Primary Examiner—Tan Dinh
(74) Attorney, Agent, or Firm—Harness, Dickey & Pierce, P.L.C.

(57) ABSTRACT

The demodulated signal from the optical disk, containing a plurality of addresses is supplied to the address decoder which sets error detection flags when address decoding fails. If all addresses fail to decode, an address interpolator performs address interpolation up to a stored maximum number of iterations, thereby allowing data to be continuously read out from the demodulated signal. The maximum number is stored in memory. If at least one address is decoded, the address interpolator selectively updates the stored maximum number to achieve higher performance in reproducing data items from the optical disk.

14 Claims, 10 Drawing Sheets

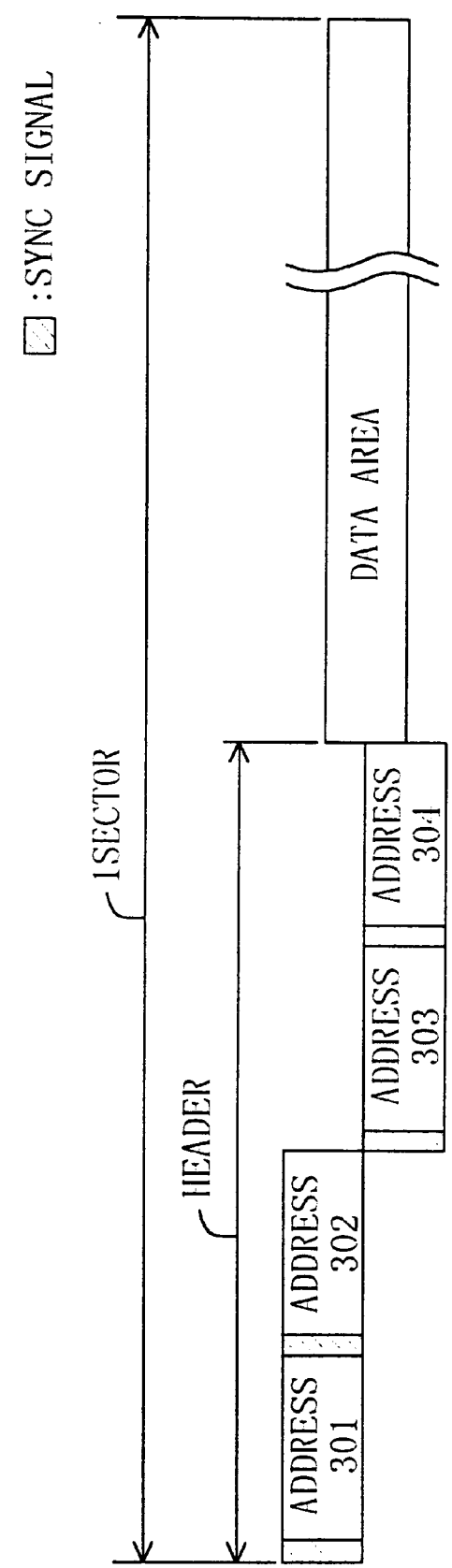

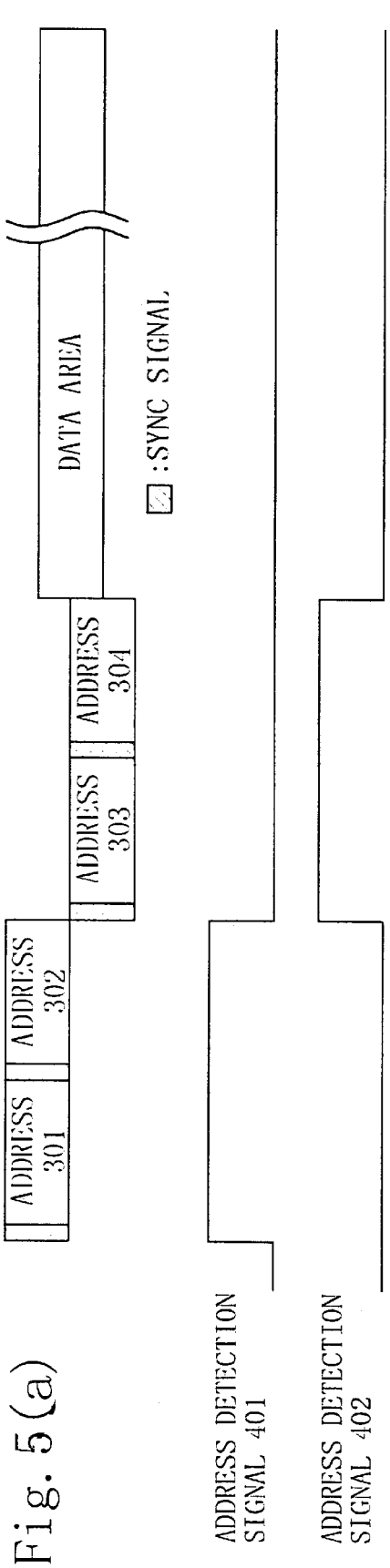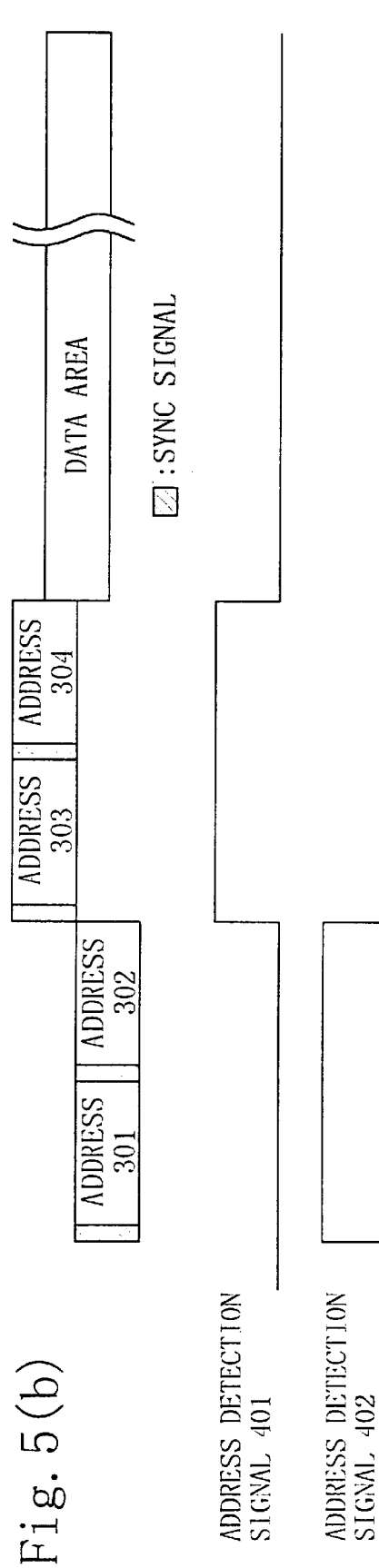

Fig. 6

ON : ERROR DETECTED
OFF : ERROR NOT DETECTED

| ADDRESS ERROR DETECTION FLAG | | | | MAXIMUM NUMBER OF TIMES OF ADDRESS INTERPOLATION |
|---|---|---|---|---|
| ADDRESS 301 | ADDRESS 302 | ADDRESS 303 | ADDRESS 304 | |
| OFF | OFF | OFF | OFF | 5 |
| OFF | OFF | OFF | ON | 5 |
| OFF | OFF | ON | OFF | 5 |
| OFF | OFF | ON | ON | 10 |
| OFF | ON | OFF | OFF | 5 |
| OFF | ON | OFF | ON | 5 |
| OFF | ON | ON | OFF | 5 |
| OFF | ON | ON | ON | 10 |
| ON | OFF | OFF | OFF | 5 |
| ON | OFF | OFF | ON | 5 |
| ON | OFF | ON | OFF | 5 |
| ON | OFF | ON | ON | 10 |
| ON | ON | OFF | OFF | 10 |
| ON | ON | OFF | ON | 10 |
| ON | ON | ON | OFF | 10 |
| ON | ON | ON | ON | 10 |

Fig. 9

| SYNC SIGNAL | ⎴ | ⎴ | ⎴ | ⎴ | ⎴ | ⎴ | ⎴ | ⎴ |
|---|---|---|---|---|---|---|---|---|
| ADDRESS ERROR DETECTION FLAG OF ADDRESS 301 | OFF | OFF | OFF | ON | ON | ON | ON | ON |
| ADDRESS ERROR DETECTION FLAG OF ADDRESS 302 | OFF | ON | OFF | ON | ON | ON | ON | ON |
| ADDRESS ERROR DETECTION FLAG OF ADDRESS 303 | OFF | ON | OFF | ON | ON | ON | ON | ON |
| ADDRESS ERROR DETECTION FLAG OF ADDRESS 304 | ON | ON | OFF | ON | ON | ON | ON | ON |
| MAXIMUM NUMBER OF TIMES OF ADDRESS INTERPOLATION | 5 | 10 | 5 | 10 | 10 | 10 | 10 | 10 |
| NUMBER OF TIMES OF ADDRESS INTERPOLATION | 5 | 10 | 5 | 4 | 3 | 2 | 1 | 0 |
| ADDRESS | 500→501→502 | | | NG | NG | NG | NG | NG |
| INTERPOLATED ADDRESS | | | 503→504→505→506→ NG ⇨ RETRY | | | | | |

METHOD AND APPARATUS FOR PERFORMING ADDRESS INTERPOLATION ON OPTICAL DISK

BACKGROUND OF THE INVENTION

The present invention relates to method and apparatus for performing address interpolation on a storage medium, such as an optical disk, in which data items and addresses, associated with the data items, are stored.

A prior art address interpolation apparatus is disclosed in Japanese Laid-Open Publication No. 8-111075, for example. FIG. 10 illustrates the configuration of this address interpolation apparatus.

In FIG. 10, an optical disk 201 is a storage medium, in which video, music or information is stored and which is rotationally driven by a spindle motor (not shown). An optical pickup 202 irradiates laser light onto the optical disk 201 and receives its reflected radiation using a photodetector, thereby reading out the information stored in the optical disk 201.

An RF signal processor 203 extracts RF reproduced signal, tracking error signal, focus error signal and so on from the information read out by the optical pickup 202 from the optical disk 201. A demodulator 204 demodulates the RF reproduced signal extracted by the RF signal processor 203. The reproduced signal, demodulated by the demodulator 204, is input to an address decoder 207 and a sync signal detector 205. The sync signal detector 205 separates a sync signal from the reproduced signal. If the sync signal is absent because of the dirt attached onto the optical disk 201, for example, then a sync signal interpolator 206 performs interpolation to obtain a substitute sync signal. Accordingly, sync signals can be obtained at regular intervals without any interruption.

The address decoder 207 performs a cyclic redundancy check (CRC) on addresses contained in the reproduced signal. If any address error has been spotted as a result of the CRC, then the address decoder 207 produces and outputs an address error detection flag. Conversely, if there are no address errors found, then the address decoder 207 outputs the correct addresses as they are. The address error detection flag is produced and output in synchronism with the substitute sync signal, which has been obtained through interpolation by the sync signal interpolator 206. An address interpolator 208 receives addresses or address error detection flags from the address decoder 207. If an address has been supplied from the address decoder 207, then the address interpolator 208 outputs the address as it is. Alternatively, if an address error detection flag has been supplied from the address decoder 207, then the address interpolator 208 produces and outputs an interpolated address. Once the number of times of address interpolation carried out in the address interpolator 208 reaches a predetermined maximum number, address reading is aborted and various types of processing like retry is performed. The maximum number of times address interpolation may be repeatedly performed back to back is defined within a range from 7 to 10, for example. It should be noted that this number of times (in this specification, referred to as a "maximum number of times of address interpolation" or simply "maximum number") is variable with the capacity of an associated memory into which data is stored.

A controller 209 receives the address or interpolated address from the address interpolator 208 and specifies an address in a storage medium (not shown), at which data, associated with the address or interpolated address, should be written.

Although not illustrated in FIG. 10, if any erroneous data items exist among a great number of data items obtained from the reproduced signal, then these erroneous data items are corrected. If such error correction is impossible, then various types of processing like retry is performed.

A conventional address interpolation apparatus like this, however, has the following problems. An address error might happen because of the dirt attached onto the surface of the disk. But another address error might happen because a servo system has lost its control due to some reason to miss the address of the target (in this specification, such a condition will be called a "servo failure"). Although an address error could happen because of any of these two different reasons, the conventional address interpolation apparatus always performs the address interpolation the same number of times, because the maximum number of times of address interpolation is fixed in the apparatus. That is to say, the address interpolation is performed regardless of whether the error results from the dirty surface of the disk or the servo failure.

Accordingly, if the address interpolation is performed the maximum number of times to correct the address error resulting from the dirty surface of the disk, then retry processing is carried out, even though no servo failure has happened. If the optical disk is partitioned into a plurality of sectors, then the same group of sectors as that read out during a series of operations is read out again. However, these sectors are located under the same dirty surface and are less likely to be read out correctly. Thus, it is highly probable that the retry processing is repeated many times. In such a situation where this processing is repeated numerous times in vain, data cannot be reproduced smoothly enough from an optical disk that often causes read errors. Accordingly, the resultant performance in reproducing data from such a disk is far from satisfactory.

On the other hand, if an address error has happened because the target address was missed due to a servo failure, then retry processing won't be started until the address interpolation has been repeatedly performed the maximum number of times. Accordingly, the retry processing cannot be performed in time and the reproducing speed adversely decreases.

SUMMARY OF THE INVENTION

An object of the present invention is providing method and apparatus for performing address interpolation on an optical disk to improve the performance and increase the speed in reproducing data from the optical disk.

To achieve this object, according to the present invention, the maximum number of times of address interpolation is not fixed at a constant value, but changed in accordance with a reproduced signal, e.g., how many times errors have happened in reading data items or associated addresses from the reproduced signal.

Specifically, the method of the present invention is designed for performing address interpolation on an optical disk, in which predetermined data items and addresses, associated with the data items, are stored. The method includes the steps of: a) reproducing a signal, containing the data items and addresses, from the optical disk; b) producing an interpolated address for at least one of the addresses that has not been decoded successfully from the reproduced signal; and c) changing, in accordance with the reproduced signal, a maximum number of times the interpolated address is produced. In the step b), the number of times the interpolated address is repeatedly produced is equal to or smaller than the changed maximum number of times.

In one embodiment of the present invention, the optical disk is partitioned into a plurality of sectors. Associated ones of the addresses are stored in each said sector. And in the step c), the maximum number of times is changed in accordance with the number of addresses that exist within each said sector and have not been decoded successfully from the reproduced signal.

In another embodiment of the present invention, in the step c), the maximum number of times is changed in accordance with the number of data items that are contained in the reproduced signal and require error correction.

In still another embodiment, the optical disk is partitioned into a plurality of sectors. And in the step c), if at least one of the data items, contained in the reproduced signal for each said sector, requires error correction, then the maximum number of times is changed into a larger number.

The apparatus of the present invention is designed for performing address interpolation on an optical disk, in which predetermined data items and addresses, associated with the data items, are stored. The apparatus. includes: means for reproducing a signal, containing the data items and addresses, from the optical disk; means for producing an interpolated address for at least one of the addresses that has not been decoded successfully from the reproduced signal; means for storing a maximum number of times the interpolated address is repeatedly produced; and means for changing the maximum number of times in accordance with the reproduced signal. The number of times the producing means repeatedly produces the interpolated address is equal to or smaller than the changed maximum number of times.

According to the present invention, if data items are often read out erroneously from an optical disk because of the dirty surface of the disk, for example, the maximum number of times of address interpolation is changed into a larger number. Thus, retry processing is less likely to be performed and the resulting performance in reproducing the data is improved. Conversely, if such read errors happen less frequently, then the maximum number of times is changed into a smaller one. Therefore, if a servo failure has happened, then retry processing is started quickly, thus increasing the reproducing speed.

BRIEF DESCRIPTION OF THE DRAWINGS

FIG. 4 illustrates a sector structure for the DVD-RAM.

FIGS. 5(a) and 5(b) illustrate how a sector address is determined based on at least one address decoded successfully.

FIG. 6 is a table of correspondence between address error detection flags and maximum numbers of times of address interpolation used in the embodiments of the present invention.

FIG. 9 is a timing diagram illustrating another exemplary interpolation processing according to the present invention.

DESCRIPTION OF THE PREFERRED EMBODIMENTS

Hereinafter, preferred embodiments of the present invention will be described with reference to the accompanying drawings.

EMBODIMENT 1

Figure 1:
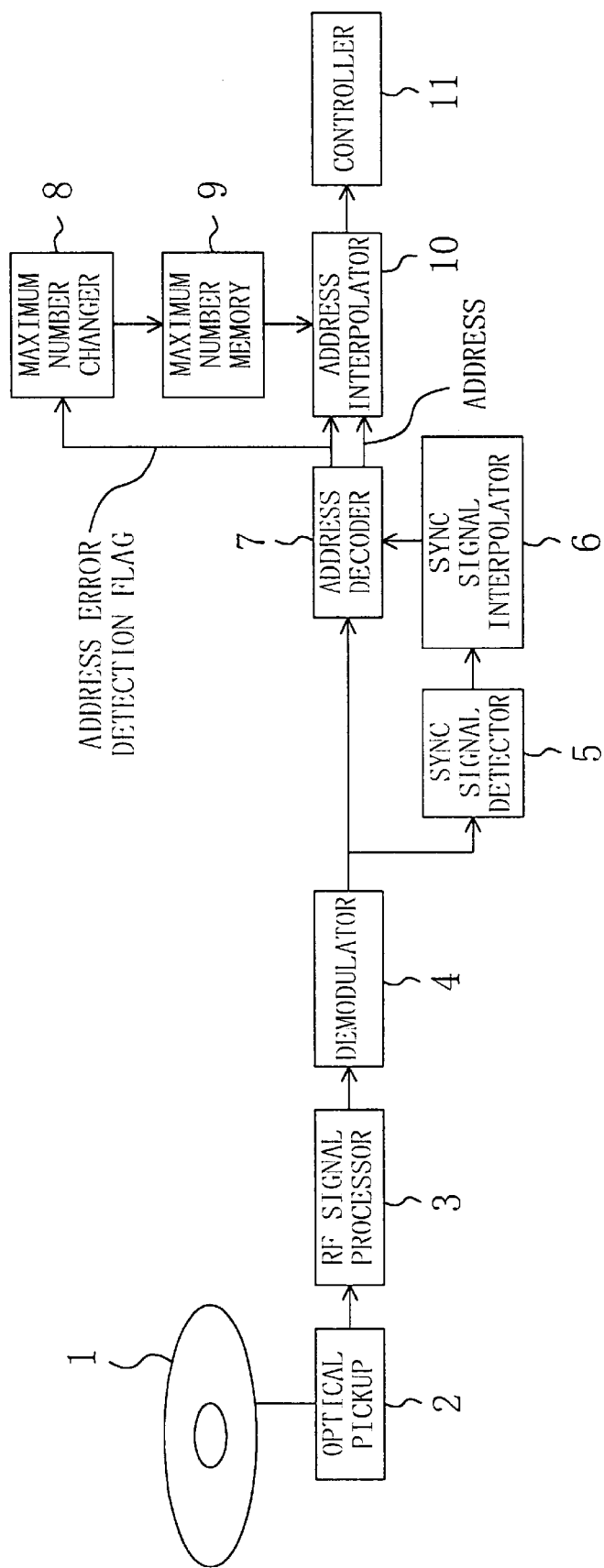
FIG. 1 is a block diagram illustrating a configuration for an address interpolation apparatus according to the first embodiment of the present invention.

FIG. 1 illustrates an exemplary configuration for an address interpolation apparatus according to the present invention.

In FIG. 1, an optical disk 1 is a storage medium, in which digital data such as video, music or information (all of these is collectively defined as "data items" in the appended claims) is stored and which is rotationally driven by a spindle motor (not shown). An optical pickup 2 irradiates laser light onto the optical disk 1 and receives its reflected radiation using a photodetector, thereby reproducing the data items stored in the optical disk 1.

An RF signal processor 3 extracts RF reproduced signal, tracking error signal, focus error signal and so on from the data items read out by the optical pickup 2 from the optical disk 1. A demodulator 4 (corresponding to "means for reproducing a signal" in the claims) demodulates the RF reproduced signal extracted by the RF signal processor 3, thereby producing and outputting a reproduced signal including the data items and associated addresses. The reproduced signal, demodulated by the demodulator 4, is input to an address decoder 7 and a sync signal detector 5. The sync signal detector 5 separates a sync signal (described later) from the reproduced signal and outputs the sync signal to a sync signal interpolator 6. If the sync signal is absent because of the dirt attached onto the optical disk 1, for example, then the sync signal interpolator 6 performs interpolation to obtain a substitute sync signal. Accordingly, sync signals can be obtained at regular intervals without any interruption.

The address decoder 7 performs a cyclic redundancy check (CRC) on the addresses contained in the reproduced signal. If there are no address errors spotted as a result of the CRC, then the address decoder 7 outputs the correct addresses as they are. In addition, the address decoder 7 produces and outputs address error detection flags (each of which is represented as ON or OFF state) for all the addresses contained in the reproduced signal. These addresses and address error detection flags are output in synchronism with the sync signal, which has been obtained through interpolation by the sync signal interpolator 6.

An address interpolator 10 (corresponding to "means for producing an interpolated address" in the claims) receives the addresses and address error detection flags from the address decoder 7. If there are any address errors, then the address interpolator 10 produces and outputs interpolated addresses based on the combination of the ON/OFF states of a series of address error detection flags supplied from the address decoder 7. The production of interpolated addresses will be described in greater detail later.

A maximum number changer 8 (corresponding to "means for hanging the maximum number of times of address interpolation" in the claims) defines the maximum number of times the address interpolation may be performed successively and repeatedly. In response to the address error detection flags supplied from the address decoder 7, the maximum number changer 8 defines a maximum number and then outputs the number to a maximum number memory 9 (corresponding to "means for storing a maximum number" in the claims). And the maximum number memory 9 stores the maximum number supplied.

The maximum number of times of address interpolation, stored in the maximum number memory 9, is next supplied to the address interpolator 10. If address errors happen successively, then the address interpolator 10 repeatedly produces interpolated addresses a numerous number of times until the number of times reaches the maximum number of times of address interpolation.

If a controller 11 has been instructed by a system controller (not shown) or the like to reproduce a specified number of sectors at predetermined addresses on the optical disk 1, then the controller 11 reads the addresses or interpolated addresses supplied from the address interpolator 10. And when one of the addresses supplied turns out to match with one of the predetermined addresses, the controller 11 starts to perform reproduction processing, thereby reproducing the specified number of sectors.

Figure 3:
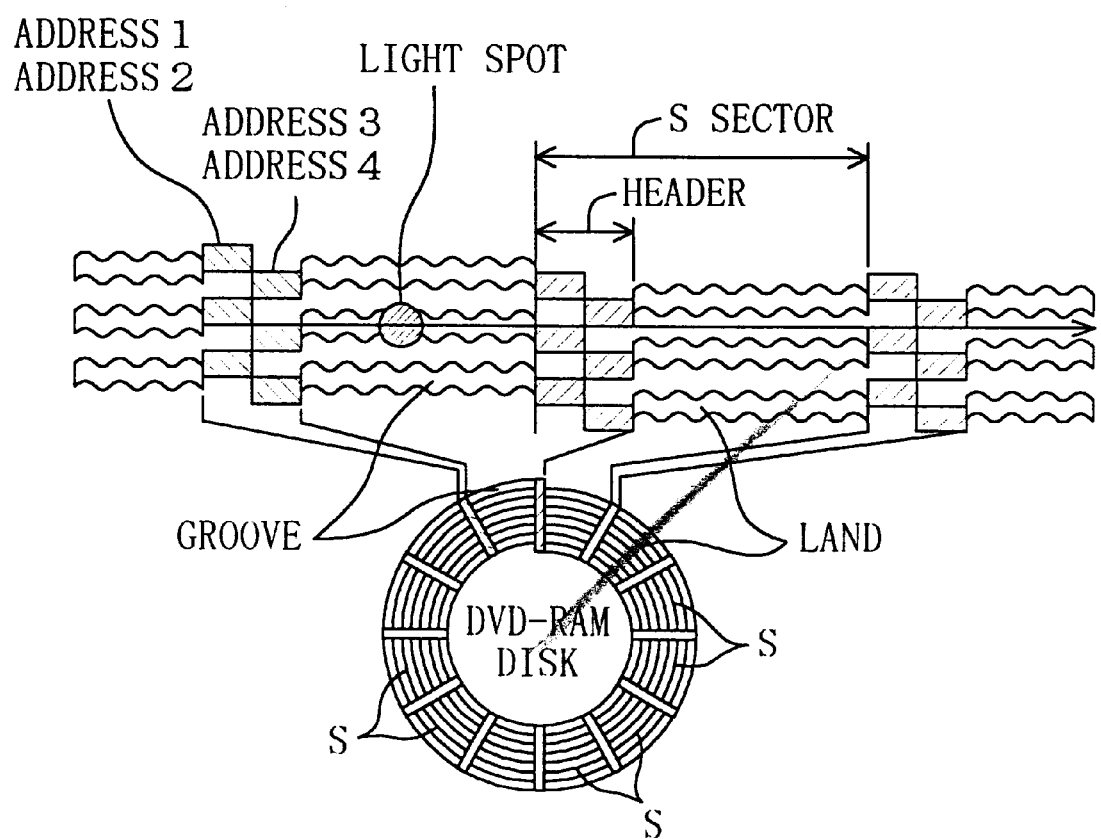
FIG. 3 illustrates a track format structure for a DVD-RAM used as an exemplary optical disk in the embodiments of the present invention.

FIG. 3 illustrates a track format structure for a DVD-RAM used as an exemplary optical disk 1 in this embodiment. On the surface of the DVD-RAM 1, a plurality of convex portions (herein defined as "grooves") and concave portions (herein defined as "lands") are provided to alternately appear at regular intervals and form a single continuous track running from the inner toward outer periphery of the disk. The lands and grooves are divided into a plurality of sectors S, each having a header including first through fourth addresses.

FIG. 4 illustrates a sector structure for the DVD-RAM. In the DVD-RAM, four areas for respectively storing four addresses 301, 302, 303 and 304 are arranged in line within each sector S. The former two addresses 301 and 302 are represented as a first address Adr1, while the latter two addresses 303 and 304 are represented as a second address Adr2. The address of the sector is defined as the smaller one of these two addresses Adr1 and Adr2. As for the DVD-RAM, the address decoder 7 receives a set of four addresses 301 through 304 from the demodulator 4 on a sector-by-sector basis, and performs the CRC on these individual addresses. If an address error has been spotted in an address, then the address decoder 7 produces and outputs an "ON" address error detection flag. Alternatively, if no error has been found in another address, then the address decoder 7 produces and outputs an "OFF" address error detection flag.

If the "ON" address error detection flags are produced and output for all of these four addresses 301 through 304, then a correct address is not identifiable and therefore address interpolation is performed. On the other hand, if the address decoder 7 has succeeded in decoding at least one of these four addresses, then the address decoder 7 determines the address of the sector in question based on the address decoded successfully.

The sector address is determined using the decoded address and two address detection signals 401 and 402 shown in FIGS. 5(*a*) and 5(*b*). These two address detection signals 401 and 402 are used to determine whether the sector in question is located on a land or a groove. One of the former two addresses 301 and 302 may have been decoded to turn associated one of the address error detection flags "OFF" and address errors may have been spotted in both of the latter two addresses 303 and 304 to turn the associated address error detection flags "ON". In such a case, if one address detection signal 401 is high and the other address detection signal 402 is low during the address decoding as shown in FIG. 5(*a*), then the sector is determined as being located on a land. Alternatively, if one address detection signal 401 is low and the other address detection signal 402 is high during the address decoding as shown in FIG. 5(*b*), then the sector is determined as being located on a groove. Alternatively, address errors may have been spotted in both of the former two addresses 301 and 302 to turn the associated address error detection flags "ON" and one of the latter two addresses 303 and 304 may have been decoded to turn associated one of the address error detection flags "OFF". In such a case, if one address detection signal 401 is low and the other address detection signal 402 is high during the address decoding as shown in FIG. 5(*a*), then the sector is determined as being located on a land. Alternatively, if one address detection signal 401 is high and the other address detection signal 402 is low during the address decoding as shown in FIG. 5(*b*), then the sector is determined as being located on a groove.

In such a situation where at least one of the addresses has been decoded successfully, the maximum number of times the address interpolation may be performed repeatedly is defined. Hereinafter, a method for defining the maximum number will be described.

If address errors have resulted from the dirt attached to the surface of the optical disk 1, such errors are very likely to happen successively because the address areas 301 through 304 are located in line on the disk 1. In such a case, if the maximum number is changed into a larger number to delay retry processing as much as possible while supposing no servo failure has happened, then improved performance will be attained in reproducing data from even an optical disk 1, frequently causing read errors.

On the other hand, if the servo failure or the like has prevented the address decoder 7 from decoding the addresses successfully and thereby caused address errors, then such errors are less likely to happen successively because servo failures will occur at random. In such a case, if the maximum number is set at a smaller number to start retry processing as soon as possible, then the reproducing speed can be increased.

In this embodiment, the maximum number of times of address interpolation is made variable as described below, thereby improving the performance and increasing the speed in reproducing data.

Hereinafter, the operation of the maximum number changer 8 will be described. In response to the address error detection flags supplied from the address decoder 7, the maximum number changer 8 performs one of the following two types of processing (1) and (2):

(1) If the address error detection flags for the former or latter two addresses 301 and 302 or 303 and 304 are both ON, then addresses are hard to decode and address interpolation is performed successively. This is because the signal quality is poor probably due to the dirty surface of the optical disk 1. In such a situation, if the maximum number were small, then the retry processing would be started sooner than required even though no servo failure has happened. During the retry processing, the same group of sectors as that read out during a series of operations is read out again. However, these sectors are still located under the same dirty surface as in the initial read operation and are less likely to be read out successfully. Thus, retry processing is very likely to be repeatedly performed. Accordingly, the maximum number of times of address interpolation should be changed into a larger number. In this embodiment, the maximum number is set at "10".

(2) In the other situations than the case (1), the maximum number is set at "5". In such a situation, address error detection flags associated with at least one of the former two addresses 301 and 302 and at least one of the latter two addresses 303 and 304 are turned OFF. In this case, address errors happen probably because some servo failure has prevented the address decoder 7 from decoding correct addresses. Thus, the surface of the optical disk 1 is not so dirty and the signal quality is better as compared with the case (1). Accordingly, under the circumstances such as these, the maximum number should be set at a number smaller than that defined in the case (1) and the retry processing should preferably be started as soon as possible.

Specific examples of the above-defined cases (1) and (2) are illustrated in the table shown in FIG. 6.

Figure 7:
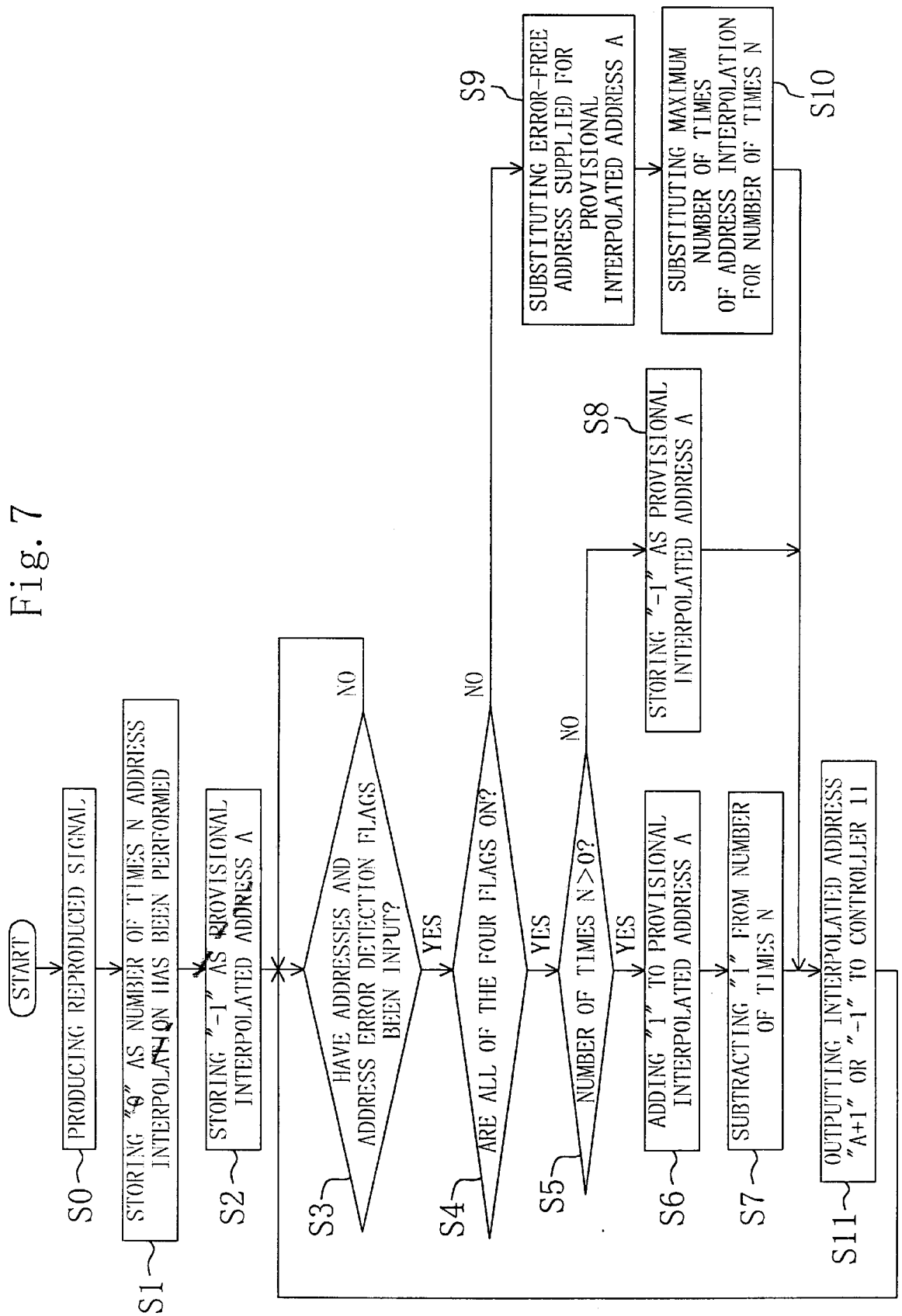
FIG. 7 is a flowchart illustrating a procedure of address interpolation according to the present invention.

Based on the addresses and address error detection flags supplied from the address decoder 7 and the maximum number of times of address interpolation supplied from the maximum number memory 9, the address interpolator 10 performs address interpolation following the flow of processing shown in FIG. 7.

FIG. 7 is a flowchart illustrating the procedure of reproduced signal production and address interpolation. First, in Step S0, the demodulator 4 produces a reproduced signal. Responsive to the reproduced signal, the address interpolator 10 starts its processing. In Step S1, the address interpolator 10 stores "0" as the number of times N address interpolation has been performed. Next, in Step S2, the address interpolator 10 stores "−1", meaning a failure in decoding an address, as a provisional interpolated address A.

Then, in Step S3, it is determined whether or not the address interpolator 10 has received four addresses and associated four address error detection flags from the address decoder 7. If the answer is yes, the address interpolator 10 determines in Step S4 whether or not all of the four address error detection flags are ON. Suppose at least one of the four address error detection flags turns out to be OFF, i.e., there is some error-free address among these four addresses. Then, the address interpolator 10 substitutes the error-free address, which has been supplied from the address decoder 7, for the provisional interpolated address A "−1" in Step S9. And in Step S10, the address interpolator 10 substitutes associated one of the maximum numbers of times of address interpolation, which are stored in the maximum number memory 9, for the number of times N of address interpolation "0".

As the other possibility, all of the four address error detection flags may turn out to be "ON" in Step S4, i.e., all of these four addresses may have errors. Then, the address interpolator 10 determines in Step S5 whether or not the number of times N of address interpolation is larger than "0". If the number of times N has turned out to be larger than "0", then "1" is added to the provisional interpolated address A, thereby producing an interpolated address in Step S6. And in Step S7, "1" is subtracted from the number of times N of address interpolation. Alternatively, if the number of times N has turned out to be "0", then "−1", meaning a failure in decoding an address, is stored as the provisional interpolated address A in Step S8.

In both situations where all of the four address error detection flags are ON and where at least one of the four flags is OFF, the address interpolator 10 outputs the interpolated address "A+1" or "−1" to the controller 11 in Step S11.

Figure 8:
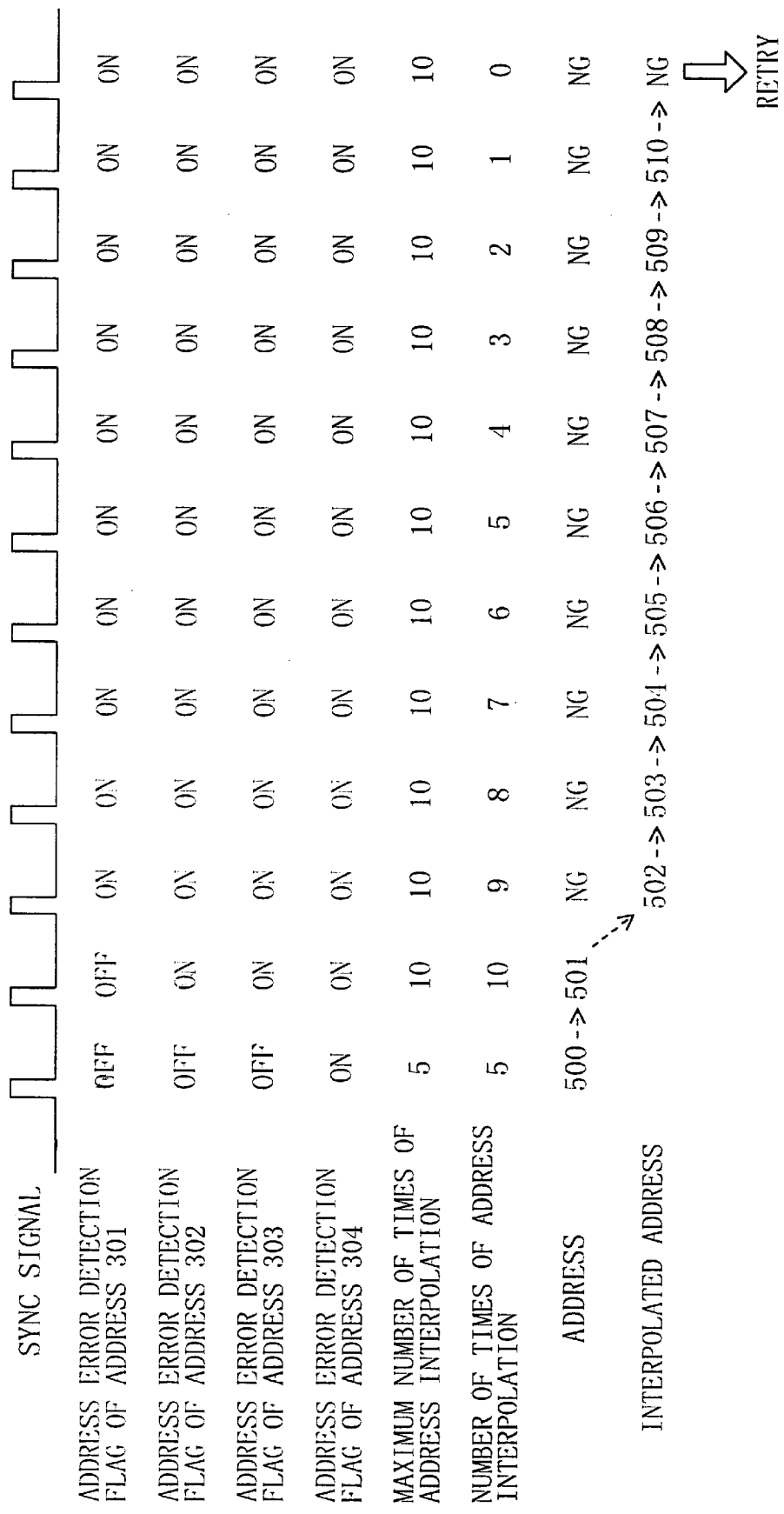
FIG. 8 is a timing diagram illustrating exemplary interpolation processing according to the present invention.
Figure 10:
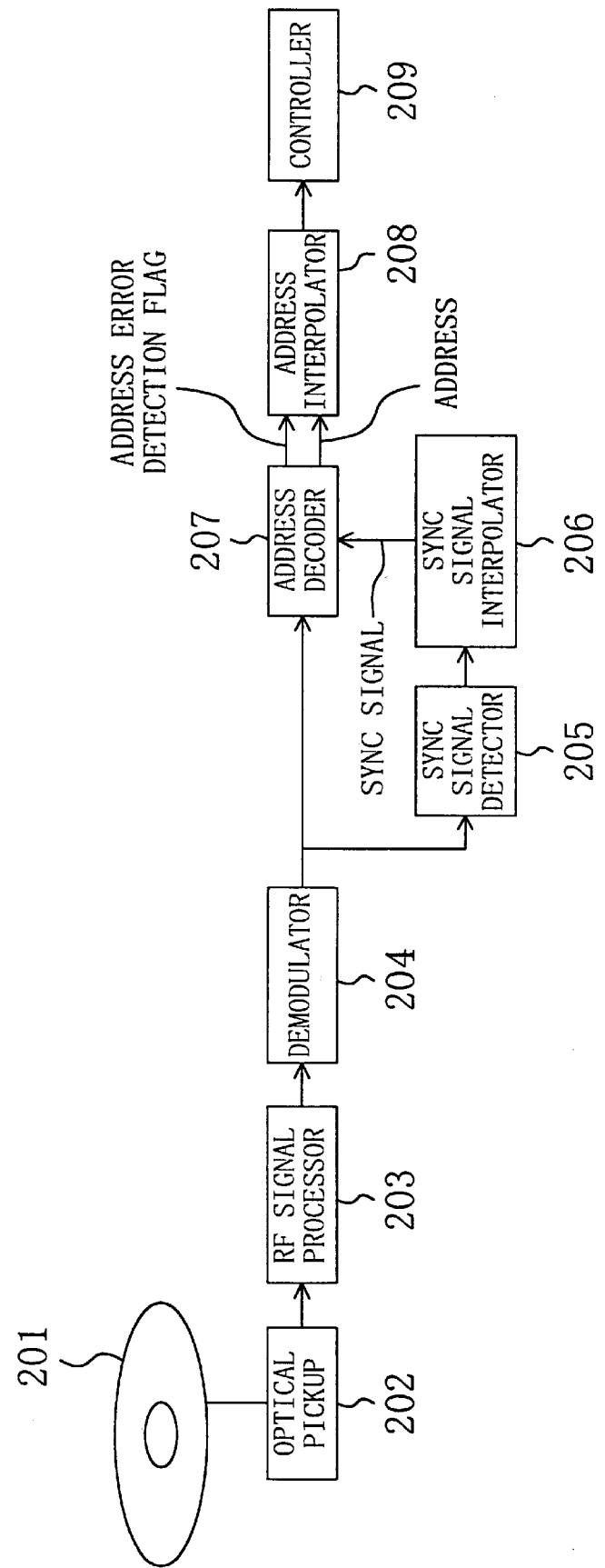
FIG. 10 is a block diagram illustrating a configuration for a conventional address interpolation apparatus.

FIGS. 8 and 9 illustrate specific examples of address interpolation processing performed by the address interpolator 10.

As shown in FIG. 8, at the sectors identified by the addresses "500" and "501", at least one of the four addresses is an error-free address. On the other hand, at the remaining ten sectors starting with the sector "502", all of the four addresses have errors. At the sector "500", the maximum number of times of address interpolation, supplied from the maximum number memory 9, is "5" as can be seen by reference to the second row in FIG. 6. At the sector "501", the maximum number of times of address interpolation, supplied from the maximum number memory 9, is "10" as can be seen by reference to the eighth row in FIG. 6. At the nine sectors starting with the sector "502", "1" is sequentially added to the error-free initial address "501", thereby producing interpolated addresses "502" through "510". And at the tenth sector since address interpolation processing was started at the sector "502", the number of times the address interpolation has been performed reaches "10", which is the maximum number of times of address interpolation. Thus, from this sector on, address interpolation processing is no longer performed, and the mode of processing is changed into retry while defining the address as "NG".

As shown in FIG. 9, at the sectors identified by the addresses "500", "501" and "502", at least one of the four addresses is an error-free address. On the other hand, at the remaining five sectors starting with the sector "503", all of the four addresses have errors. At the sector "500", the maximum number of times of address interpolation, supplied from the maximum number memory 9, is "5" as can be seen by reference to the second row in FIG. 6. At the sector "501", the maximum number of times of address interpolation, supplied from the maximum number memory 9, is "10" as can be seen by reference to the eighth row in FIG. 6. At the sector "502", the maximum number of times of address interpolation, supplied from the maximum number memory 9, is "5" as can be seen by reference to the first row in FIG. 6. And at the succeeding four sectors starting with the sector "503", "1" is sequentially added to the initial address "502", thereby producing the addresses "503" through "506". At the fifth sector since address interpolation processing was started at the sector "503", the number of times the address interpolation has been performed reaches "5", which is the maximum number of times of address interpolation. Thus, from this sector on, address interpolation processing is no longer performed, and the mode of processing is changed into retry while defining the address as "NG".

In the specific example shown in FIG. 8, judging from the addresses of the sector "501" preceding the sector "502" where address interpolation processing is started, the signal quality would be poor and read errors might happen relatively frequently on the optical disk 1. Accordingly, in such a case, the start of retry processing should be delayed as much as possible by attributing the cause of address errors to the dirty surface of the optical disk 1. On the other hand, in the specific example shown in FIG. 9, judging from the addresses of the sector "502" preceding the sector "503" where address interpolation processing is started, the signal quality would be good and read errors might happen less frequently on the optical disk 1. Accordingly, in such a case, the retry processing should be started as soon as possible because the servo failure or the like probably has prevented the address decoder 7 from decoding addresses successfully.

In this embodiment, no matter whether address errors may happen because of the dirty surface of the optical disk 1 or because the servo failure or the like has prevented the address decoder 7 from decoding addresses correctly, an appropriate maximum number of times can be defined for address interpolation.

In general, if address errors happen due to the dirty surface of an optical disk, it is no use repeatedly performing retry processing many times, because the same group of sectors as that read out during a series of operations is still located under the same dirty surface. In such a case, no matter how many times the retry processing may be performed, the processing is very likely to end in the same failure every time.

In contrast, in accordance with the method of this embodiment, if address errors happen due to the dirty surface of the optical disk 1, then a relatively large number of "10" is defined as a maximum number of times of address interpolation. Accordingly, even if the optical disk 1 has caused read errors many times, the data stored in the disk 1 can be reproduced without performing the retry processing sooner than required, thus improving the performance in reproducing the data from such an optical disk 1. Also, if address errors happen because the servo failure or the like has prevented the address decoder 7 from decoding addresses successfully, then the maximum number of times of address interpolation is changed into a smaller one in accordance with this embodiment. Accordingly, the address interpolation is performed the smaller number of times and the retry processing can be started more quickly, thus increasing the reproducing speed.

In the foregoing example, if the former two addresses 301 and 302 or the latter two addresses 303 and 304 have errors among the four addresses, then the maximum number of times of address interpolation is defined at "10". In the other situations, the maximum number is set at "5". However, it is naturally possible to use any values other than "10" or "5" as the maximum numbers. Furthermore, although only two sorts of numbers "10" and "5" are used in the foregoing embodiment as the maximum numbers, three or more sorts of numbers may be prepared and selectively used depending on the combination of errors caused at the four addresses.

EMBODIMENT 2

Next, an address interpolation apparatus according to the second embodiment of the present invention will be described. Only the difference between the first and second embodiments will be explained in the following description.

Figure 2:
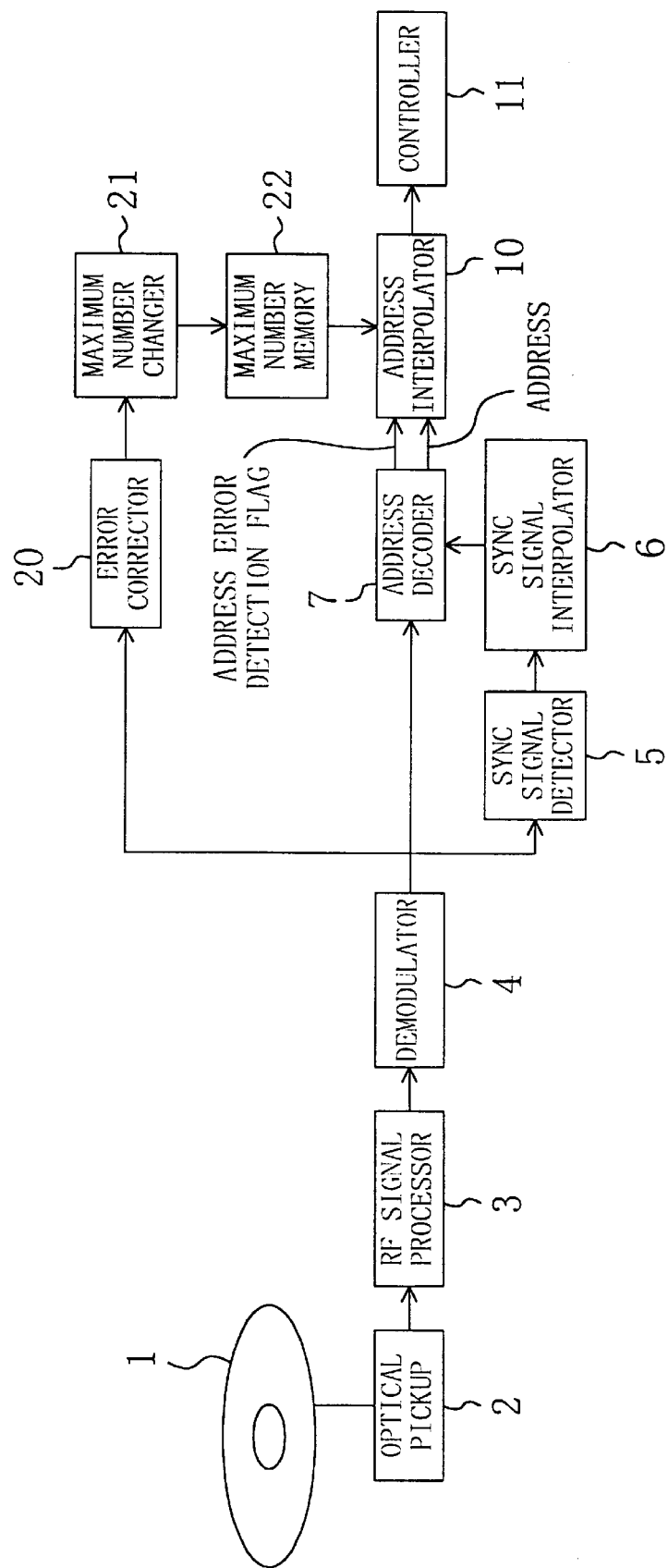
FIG. 2 is a block diagram illustrating a configuration or an address interpolation apparatus according to the second embodiment of the present invention.

FIG. 2 illustrates a configuration for an address interpolation apparatus of the second embodiment. In FIG. 2, the same components as those of the apparatus of the first embodiment are identified by the same reference numerals and the description thereof will be omitted herein.

As shown in FIG. 2, the apparatus of the second embodiment further includes an error corrector 20, which is absent from the apparatus of the first embodiment. If any of a large number of data items, contained in the reproduced signal demodulated by the demodulator 4, require error correction, then the error corrector 20 corrects the errors of such data items and outputs data error detection flags.

In response to the data error detection flags supplied from the error corrector 20, a maximum number changer 21 defines the maximum number of times of address interpolation as described below and outputs the number to a maximum number memory 22.

Based on the data error detection flags supplied from the error corrector 20, the maximum number changer 21 performs one of the following two types of processing (3) and (4):

(3) If at least one data error detection flag is ON in each sector, then addresses are hard to decode and address interpolation is performed successively. This is because the signal quality is poor probably due to the dirty surface of the optical disk 1. In such a situation, if the maximum number were small, then the retry processing would be started sooner than required even though no servo failure has happened. During the retry processing, the same group of sectors as that read out during a series of operations is read out again. However, these sectors are still located under the same dirty surface as in the initial read operation and are less likely to be read out successfully. Thus, retry processing is very likely to be repeated. Accordingly, the maximum number of times of address interpolation should be changed into a larger number. In this embodiment, the maximum number is set at "10".

(4) In the other situations than the case (3), the maximum number is set at "5". In such a situation, address errors happen probably because some servo failure has prevented the address decoder 7 from decoding addresses correctly. Thus, the surface of the optical disk 1 is not so dirty and the signal quality is better as compared with the case (3). Accordingly, under the circumstances such as these, the maximum number should be set at a number smaller than that used in the case (3) and the retry processing should preferably be started as soon as possible.

In the other respects, including the operation of the address interpolator 10, this embodiment is the same as the first embodiment. Accordingly, in this embodiment, if data errors happen due to the dirty surface of the optical disk 1, then the maximum number of times of address interpolation is also set at the larger number "10". In such a case, the data stored in the disk 1 can be reproduced without getting the retry processing started sooner than required, thus improving the performance in reproducing the data from such an optical disk 1. Also, if data errors happen because the servo failure or the like has prevented the address decoder 7 from decoding addresses successfully, then the maximum number of times of address interpolation is changed into the smaller number "15". Accordingly, the retry processing can be started more quickly, thus advantageously increasing the reproducing speed.

In the foregoing example, if at least one data error detection flag is ON in each sector, then the maximum number of times of address interpolation is set at "10". In the other situations, the maximum number is set at "5". However, it is naturally possible to use any values other than "10" or "5" as the maximum numbers. Furthermore, although only two sorts of numbers "10" and "5" are used in the foregoing embodiment, three or more sorts of numbers may be naturally prepared and selectively used depending on the number of data error detection flags, i.e., how many times data errors have happened.

Moreover, in the foregoing embodiment, each sector S on the optical disk 1 has four addresses 301 through 304. However, it is only necessary to provide at least one address for each sector, because this embodiment is characterized by changing the maximum number into a larger one if at least one data error detection flag has been turned ON.

What is claimed:

1. A method for performing address interpolation on an optical disk, in which predetermined data items and addresses, associated with the data items, are stored, the method comprising the steps of:

a) reproducing a signal, containing the data items and addresses, from the optical disk;

b) producing an interpolated address for at least one of the addresses that has not been decoded successfully from the reproduced signal; and c) changing, in accordance with the reproduced signal, a maximum number of times the interpolated address is produced, wherein in the step b), the number of times the interpolated address is repeatedly produced is equal to or smaller than the changed maximum number of times.

2. The method of claim 1, wherein the optical disk is partitioned into a plurality of sectors, associated ones of the addresses being stored in each said sector, and wherein in the step c), the maximum number of times is changed in accordance with the number of addresses that exist within each said sector and have not been decoded successfully from the reproduced signal.

3. The method of claim 2, wherein in the step c), the larger the number of the addresses that have not been decoded successfully is, the larger the maximum number of times defined is.

4. The method of claim 2, wherein first through fourth addresses are sequentially stored in line in each said sector of the optical disk, and wherein the first and second addresses have a common value, and the third and fourth addresses have another common value, and wherein in the step c), if the first and second addresses or the third and fourth addresses have not been decoded successfully, then the maximum number of times is changed into a number larger than the maximum number of times defined where the first through fourth addresses all have been decoded successfully.

5. The method of claim 1, wherein in the step c), the maximum number of times is changed in accordance with the number of data items that are contained in the reproduced signal and require error correction.

6. The method of claim 1, wherein the optical disk is partitioned into a plurality of sectors, and wherein in the step c), if at least one of the data items, contained in the reproduced signal for each said sector, requires error correction, then the maximum number of times is changed into a larger number.

7. The method of claim 5, wherein the optical disk is partitioned into a plurality of sectors, and at least one address is stored in each said sector.

8. An apparatus for performing address interpolation on an optical disk, in which predetermined data items and addresses, associated with the data items, are stored, the apparatus comprising:

means for reproducing a signal, containing the data items and addresses, from the optical disk;

means for producing an interpolated address for at least one of the addresses that has not been decoded successfully from the reproduced signal;

means for storing a maximum number of times the interpolated address is repeatedly produced; and means for changing the maximum number of times in accordance with the reproduced signal, wherein the number of times the producing means repeatedly produces the interpolated address is equal to or smaller than the changed maximum number of times.

9. The apparatus of claim 8, wherein the optical disk is partitioned into a plurality of sectors, associated ones of the addresses being stored in each said sector, and wherein the changing means changes the maximum number of times in accordance with the number of addresses that exist within each said sector and have not been decoded successfully from the reproduced signal.

10. The apparatus of claim 9, wherein the larger the number of addresses that have not been decoded successfully is, the larger the maximum number of times defined by the changing means is.

11. The apparatus of claim 9, wherein first through fourth addresses are stored sequentially in line in each said sector of the optical disk, and wherein the first and second addresses have a common value, and the third and fourth addresses have another common value, and wherein if the first and second addresses or the third and fourth addresses have not been decoded successfully, then the maximum number of times is changed by the changing means into a number larger than the maximum number of times defined where the first through fourth addresses all have been decoded successfully.

12. The apparatus of claim 8, wherein the changing means changes the maximum number of times in accordance with the number of data items that are contained in the reproduced signal and require error correction.

13. The apparatus of claim 8, wherein the optical disk is partitioned into a plurality of sectors, and wherein if at least one of the data items, contained in the reproduced signal for each said sector, requires error correction, then the changing means changes the maximum number of times into a larger number.

14. The apparatus of claim 12, wherein the optical disk is partitioned into a plurality of sectors, and at least one address is stored in each said sector.

* * * * *